(12) United States Patent  
Dawson

(10) Patent No.: US 6,515,661 B1  
(45) Date of Patent: Feb. 4, 2003

(54) ANTI-ALIASING BUFFER

(75) Inventor: Thomas Dawson, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/473,900

(22) Filed: Dec. 28, 1999

(51) Int. Cl.[7] .............................................. G06T 17/00
(52) U.S. Cl. ...................................................... 345/422
(58) Field of Search ................................. 345/422, 428, 345/421, 443

(56) References Cited

PUBLICATIONS

Schilling, Andreas, "A New Simple and Efficient Antialiasing with Subpixel Masks," Computer Graphics, vol. 25, No. 4, 133–141, Jul. 1991.

Winner, Stephanie, et al., "Hardward Accelerated Rendering of Antialiasing Using a Modified A–buffer Algorithm," Computer Graphics Proceedings, Annual Conference Series, 307–316, 1997.

*Primary Examiner*—Mark Zimmerman
*Assistant Examiner*—Huedung X. Cao
(74) *Attorney, Agent, or Firm*—Blakely, Sokoloff, Taylor & Zafman LLP

(57) ABSTRACT

A method and a system for anti-aliasing using Z and Z offset values are disclosed. In one embodiment, an image rendering system includes a processor and a device. The device is configured to store a first value, a second value, a first offset value, and a second offset value. The first value represents a Z value of a first sub-fragment and the second value points to a sub-fragment location that corresponds to the first sub-fragment. The first offset value represents an offset value of the first value in x-direction and the second offset value represents an offset value of the first value in y-direction. The processor is configured to perform an anti-aliasing function using the first value, the second value, the first offset value, and the second offset value.

32 Claims, 11 Drawing Sheets

200

VERTEX DATA

FRAGMENT DATA

PIXEL DATA

VIDEO OUT

ANTI-ALIASING BUFFER

BACKGROUND OF THE INVENTION

1. Field of the Invention

The present invention relates generally to the field of computer systems. Specifically, the present invention relates to an implementation of graphic image rendering.

2. Description of the Related Art

In the computing industry, it is quite common to represent and convey information to a user through graphic representations. These representations may take a variety of forms, such as for example, three-dimensional objects or alphanumeric characters. To display a three-dimensional object on a two-dimensional display, the computer system must be able to include perspective in the images to add dimension. Moreover, in the case where solid three-dimensional objects are to be depicted, some mechanism must be used such that hidden surfaces are recognized and portions of the image appropriately eliminated, to obtain the desired three-dimensional effect.

A geometric model is typically comprised of one or more polygons, which may be considered as the basic building blocks for the image. In order to display a smooth edged polygon, anti-aliasing is typically performed. One conventional mechanism of anti-aliasing typically employs an A-buffer.

However, a problem with a conventional A-buffer is that it only anti-aliases polygon edges that are defined according to the vertex data. When a new edge is created due to polygon intersections, such as, for example, a first polygon "passing through" a second polygon, the new edge may not be anti-aliased because the new edge information was not included in the original vertex data. Thus, to maintain a high quality image, polygon intersection is typically not permitted.

Thus, a conventional solution to handle polygon intersection is to split intersected polygons into smaller polygons so that the smaller polygons do not intersect with one another. However, to detect intersected polygons and to split intersected polygons requires intensive computing power, which typically reduces overall system performance.

SUMMARY OF THE INVENTION

A graphics rendering system includes a processor and a device. The device is configured to store a first value, a second value, a first offset value, and a second offset value. The first value represents a Z value of a first sub-fragment and the second value points to a sub-fragment location that corresponds to the first sub-fragment. The first offset value represents an offset value of the first value in the x-direction and the second offset value represents an offset value of the first value in the y-direction. The processor is configured to perform an anti-aliasing function using the first value, the second value, the first offset value, and the second offset value.

BRIEF DESCRIPTION OF THE DRAWINGS

The objects, features and advantages of the present invention will be apparent to one skilled in the art from the following detailed description in which.

DETAILED DESCRIPTION

Figure 1A:
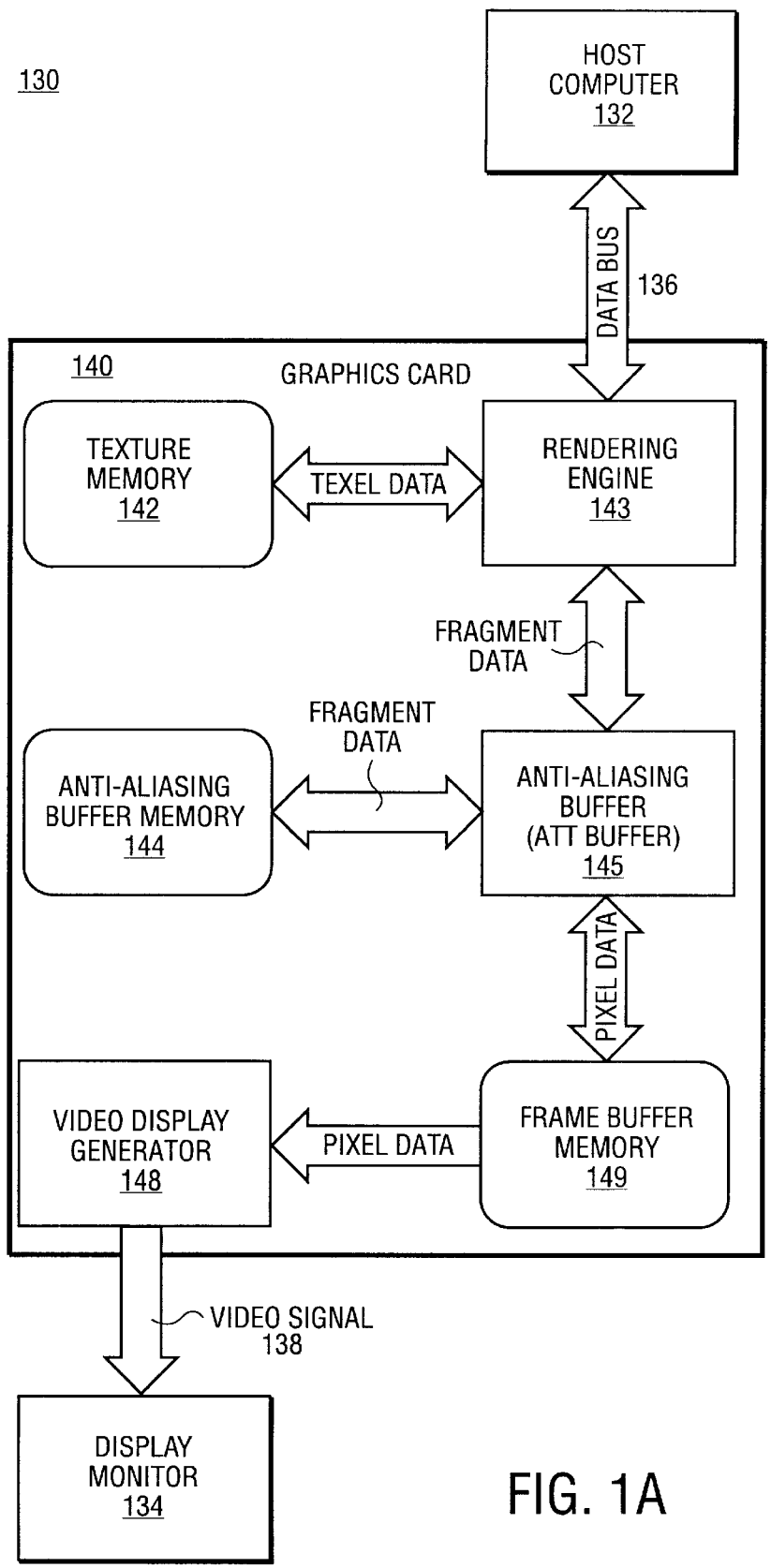
FIG. 1A illustrates one embodiment of a system having a graphic rendering card.

A method and a system for anti-aliasing using Z and Z offset values are disclosed.

In the following description numerous specific details are set forth in order to provide a thorough understanding of the present invention. It will be apparent, however, to one having ordinary skill in the art that the specific detail need not be employed to practice the present invention. In other instances, well known materials or methods have not been described in detail in order to avoid obscuring the present invention.

A mechanism for anti-aliasing all edges of a rendered image including those edges not present in the original polygon description but arising from polygons interpenetrations. In one embodiment, the mechanism for antialiasing is implemented in a graphic card, such as, for example, a graphics accelerator card or a graphics-rendering card. A graphics accelerator cards may be attached to a computer system or a host system and allows graphics images to be drawn at very high rates, commonly referred to as "real-time rendering". In one embodiment, the graphics card is implemented by a set of custom Application Specific Integrated Circuits ("ASICs").

The graphics accelerator card is, in one embodiment, connected to the host processor system through a data bus. This can be the system bus or a special bus dedicated to handling graphics data. A device driver software program is located on the host system that provides an Application Programming Interface (API) layer through which drawing commands can be passed over the bus to the graphics card. In this embodiment, the device driver translates the API drawing commands into data streams that are understood by the graphics accelerator card.

The graphics card will contain one or more ASICs depending on the choice of implementation by the card's manufacturer. A typical layout for a graphics card is shown in FIG. 1. The manufacturer may choose to implement all items shown in FIG. 1 in a single large ASIC or may choose to divide up the blocks among several ASICs. The choice of whether to place the texture memory, anti-aliasing buffer memory and frame buffer memory on the ASIC or as (a) separate part(s) is up to the implementation. In some cases the pixel data coming from the anti-aliasing buffer is sent to the video display generator, which manages access to the frame buffer.

In one embodiment, a mechanism is capable of anti-aliasing all edges of a rendered image or a polygon regardless of whether the edges are specified in the vertex data or not. For example, the mechanism may anti-alias an edge that results from polygon intersection or polygon penetration. The polygon intersection or polygon penetration creates new edges due to multiple polygons that intersect or penetrate one another. The edges created from polygon intersection are commonly not specified in the vertex data. Accordingly, the presently disclosed anti-aliasing mechanism improves the overall system performance since it is capable of anti-aliasing all edges of a polygon without performing the process of detecting and splitting the intersected polygons.

A graphics rendering system is, in one embodiment, configured to store information, which includes a first value, a second value, a first offset value, and a second offset value. The first value represents a Z value of a first sub-fragment and the second value points to a sub-fragment location that corresponds to the first sub-fragment. The first offset value represents an offset value of the first value in the x-direction and the second offset value represents an offset value of the first value in the y-direction. This information is used to encode the slope of the polygon away from a viewer and the information is, subsequently, passed to the anti-aliasing buffer.

FIG. 1A illustrates one embodiment of a system 130 having a graphic card. System 130 contains a host computer 132, a graphics card 140, and a display monitor 134. Graphics card 140 further includes a rendering engine 143, an anti-aliasing buffer 145, a frame buffer memory 149, a texture memory 142, a anti-aliasing buffer memory 144, and a video display generator 148. Other components may be added in system 130, but they are not important to understanding the disclosed system.

In one embodiment, rendering engine 143 performs a function using a mechanism that describes the properties of a geometric shape, such as, for example, a polygon, where the properties are quantified into small fragments of data which represent the contribution by that polygon to a particular pixel location in the frame buffer. In one embodiment, a fragment is a portion of a rendered geometric shape that covers a single pixel on the display screen. In another embodiment, anti-aliasing buffer 145 is an intermediary between the rendering engine 143 and the frame buffer 149 and it collects the fragment information into individual stacks mapped to pixel locations in the frame buffer 149. Each stack is evaluated for all the contributions of the members of the stack to the final color value. The resulting color value is sent to the frame buffer 149 to be assigned to that pixel location. In another embodiment, frame buffer memory 149 is a memory array that holds pixel values which are scanned by a video encoding mechanism for display on a video or computer screen.

Host computer 132 is, in one embodiment, a processor based computer system and is coupled to graphics card 140 via a bus 136. Graphics card 140 is further connected to display monitor 134 via a bus 138. Display monitor 134 is, in one embodiment, a digital display, such as, for example, a cathode ray tube (CRT) or liquid crystal display (LCD).

Figure 1B:
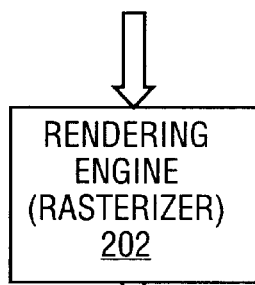
FIG. 1B is a block diagram illustrating one embodiment of a process for implementing rendering using an A++ buffer.
Figure 1B:
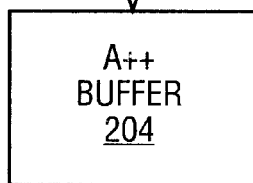
Figure 1B:
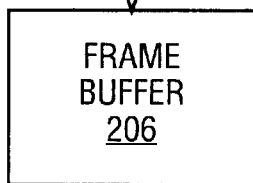

FIG. 1B is a block diagram 200 illustrating one embodiment of a process for implementing graphics rendering using a buffer, such as, for example, an A++ buffer or an anti-aliasing buffer, in accordance with the teachings of the present invention, referred to herein as an A++ buffer. Block diagram 200 contains a rasterizer 202, also known as a rendering engine, an A++ buffer 204, and a frame buffer 206. It should be noted that other blocks may be included, but they are not pertinent to understanding the present invention.

Rasterizer 202, in one embodiment, samples a polygon and converts the vertex data of the polygon into fragment data representative of portions of a polygon. It should be appreciated that polygons are commonly used to describe an object for rendering as an image. Fragment data represents a fragment and may include a group of pixels or sub-fragments. For example, a fragment could be the same size as a pixel or multiple pixels forming a portion of an image, such as, a portion of a polygon. Moreover, a fragment, in one embodiment, contains information about the position, color, depth, coverage (coverage mask), and transparency of a particular portion of a polygon that covers the area of one pixel.

Rasterizer 202 is, in one embodiment, configured to identify a base Z value ("BZV"), a corner tag field ("CTF"), and two coded Z offset values ("ZOV"). In one embodiment, the CTF identifies which corner of a fragment is the closest corner to the viewer. In an alternative embodiment, the CTF identifies which corner of a fragment is the farthest corner to the viewer. The BZV may be Z value, which indicates the distance to a sub-fragment that is located at the closest corner of the fragment to the viewer. The coded ZOVs may be used to determine other Z values of sub-fragments within the fragment. Once the BZV, the CTF, and two coded ZOVs are identified, they are passed to A++ buffer 204.

When fragment data is received, A++ buffer 204 evaluates the fragment stack at that location to determine the resulting pixel color. It then stores the fragment stack along with the new fragment data back into the A++ buffer memory. In addition to the functions that a conventional A buffer can provide, A++ buffer 204 also provides additional information, such as, for example, the BZV, CTF, and ZOVs, to facilitate a Z depth test on every sub-fragment. A sub-fragment is, in one embodiment, a subsection of a fragment, which may be defined by the fragment coverage mask.

The fragment coverage mask is, in one embodiment, a binary representation of an array that indicates which sub-fragments are included as part of the polygon and which are not. For example, a 4×4 fragment coverage mask would be a 16 bit binary value where each successive four bits describe a row of sub-fragments with each bit indicate the inclusion (a logic 1) or exclusion (a logic 0) of that sub-fragment with the polygon. Because the Z depth test is performed on every sub-fragment, all edges, regardless of whether they are in the vertex data or not, are anti-aliased. Frame buffer 206, in one embodiment, obtains pixel data from A++buffer 204 and provides the data to a video display hardware for displaying images.

In an operation, after rasterizer 202 receives vertex data describing a polygon, the vertex data is transformed into the fragment data. Once the fragment data is passed to A++ buffer 204, all the fragment data for that location is evaluated to determine the final pixel color. The final pixel color is subsequently, sent to the frame buffer 206. The fragment stack including the new fragment is then stored in A++ buffer memory.

Figure 2:
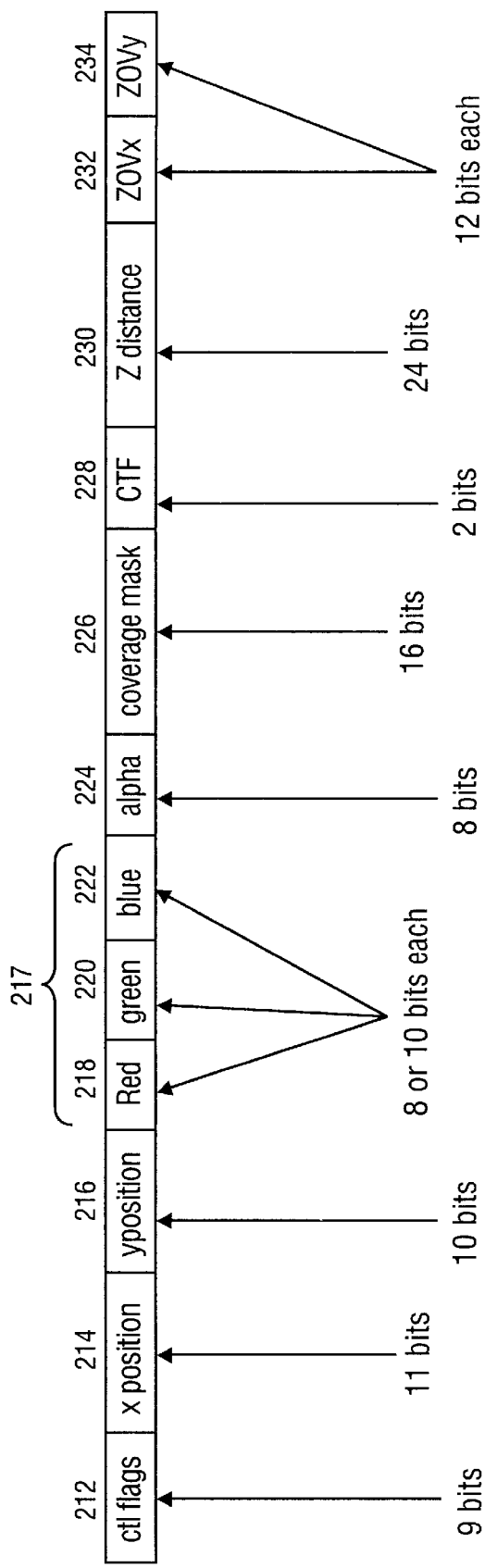
FIG. 2 illustrates one embodiment of a data format for storing fragment information.

FIG. 2 illustrates one embodiment of a data format 210 for storing fragment information. Data format 210 is a 128-bit data format that contains a control flags portion 212, a x-position portion 214, a y-position portion 216, a color portion 217, an alpha portion 224, a fragment coverage mask 226, a CTF portion 228, a Z distance portion 230, a ZOVx portion 232, and a ZOVy portion 234. Color portion 217 further contains a red portion 218, a green portion 220, and a blue portion 222.

In one embodiment, data format 210 is passed from the rendering engine 202 to A++ buffer 204. A fragment stack is formed by multiple data format 210. Other types of data formats may be used to store the fragment information, but they are not important to understanding the disclosed present invention.

Figure 3:
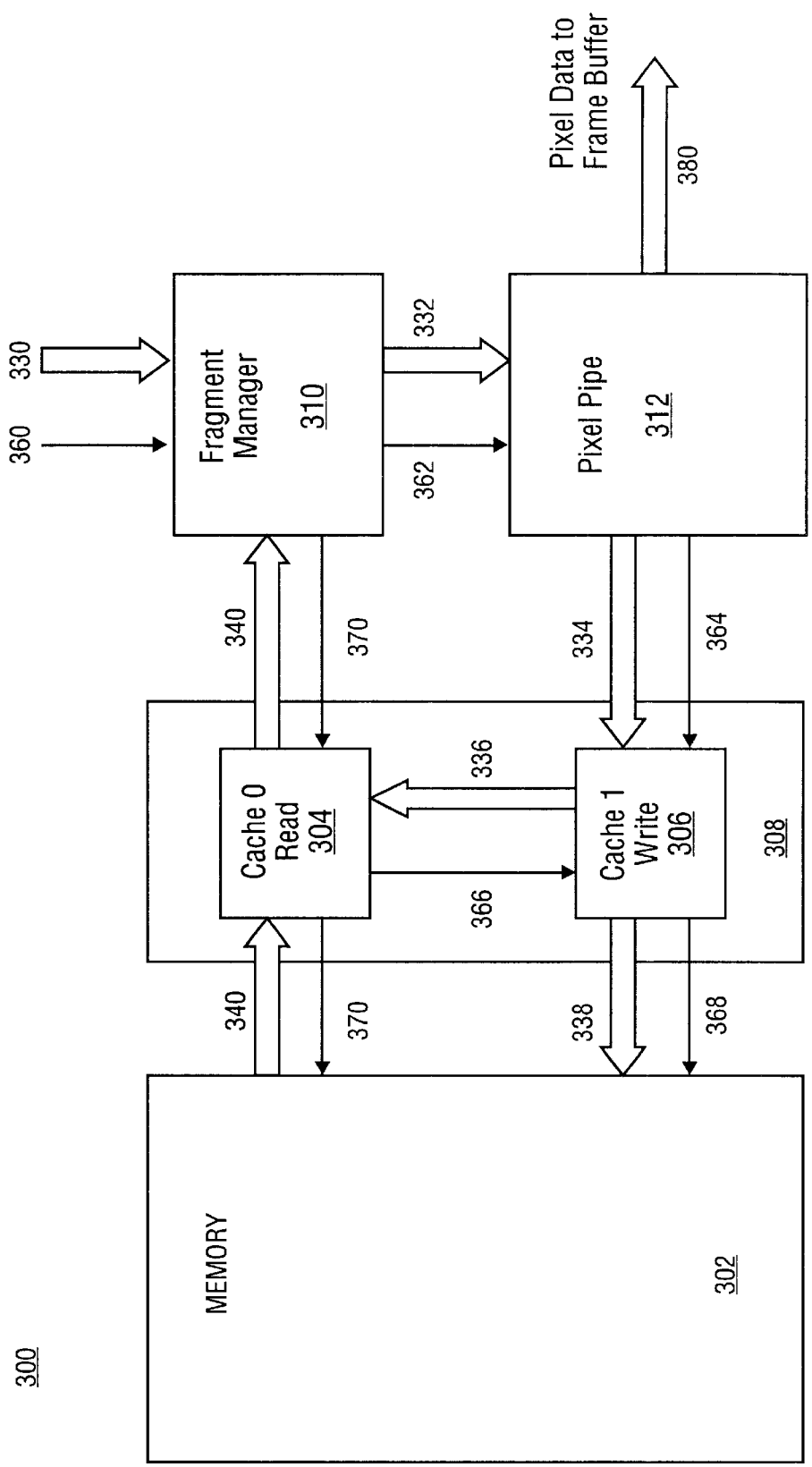
FIG. 3 illustrates one embodiment of a buffer in accordance with the teachings of the present invention.

FIG. 3 illustrates one embodiment of A++ buffer 300, which contains a memory 302, a cache memory 308, a fragment manager 310, and a pixel pipe 312. Cache memory 308 further contains a read cache 304 and a write cache 306. Other components may be added to A++ buffer 300, but they are not pertinent to understanding the present invention.

The components are, in one embodiment, interconnected through multiple buses including data and command buses. Data buses include fragment data buses 330, 332, 334, 336, 338, 340, 342 and a pixel data bus 380. In one embodiment, command buses 366, 370, 372 transmit fetch request while command buses 364 and 368 transmit store request.

Memory 302, in one embodiment, stores a unique stack of fragments for each pixel location in the frame buffer. Each stack of fragments represents the contributions from a set of polygons to one pixel in the frame buffer. The fragment stacks are mapped to correspond with pixel locations in the frame buffer. Each fragment of the stack may have a unique Z value. Thus, memory 302 is capable of storing multiple layers of fragments for a single pixel location. The stack of fragments is used to determine the color to be stored in the frame buffer for that pixel location. Each fragment contains a BZV, a CTF, and ZOVs and are stored in memory 302. Memory 302 may also store other information, but it is not pertinent to understanding the present invention.

Cache memory 308, in one embodiment, contains a read cache 304 and a write cache 306 for improving memory access time. Read cache 302 is used in connection with a read command while write cache 306 is used in connection with a write command. In an alternative embodiment, read cache 304 and write cache 306 may be combined into a single cache memory. In yet another embodiment, cache memory 308 may be omitted from the A++ buffer structure 300.

Fragment manager 310 receives incoming fragments over data bus 330 and incoming control signals over command bus 360. Upon receipt of the incoming fragments and the control signals, fragment manager 310, in one embodiment, identifies the pixel location of each incoming fragment and fetches the corresponding stack of fragments from read cache 304. If read cache 304 does not contain the requested data, the data is obtained from memory 302. After obtaining the stack of fragments, the stack and the incoming fragment are passed onto pixel pipe 312 via fragment data bus 332.

In one embodiment, pixel pipe 312 receives the fragment data from fragment manager 310 and performs a Z depth test on each sub-fragment of the fragment stack. In one embodiment, the Z depth test compares the Z values of sub-fragments within the stack to determine which sub-fragments are on the top of the stack. Fragments are lined up in the stack according to the Z values. The fragment situated on the top of the stack is closest to the viewer and the fragments situated below the top of the stack may or may not be hidden. However, any hidden fragments may still affect the final pixel color at that location through, for example, color, coverage mask, intensity, and/or transparency of the fragments in the stack.

In one embodiment, all fragments are sloped away from the viewer, the slope values embodied by Zdx and Zdy, as will be described in more detail below, are always positive. The positive slope values also simplify the mechanism for reconstructing individual Z values for all sub-fragments. It should be appreciated that the Z depth test for various sub-fragments may be performed in parallel.

Figure 4:
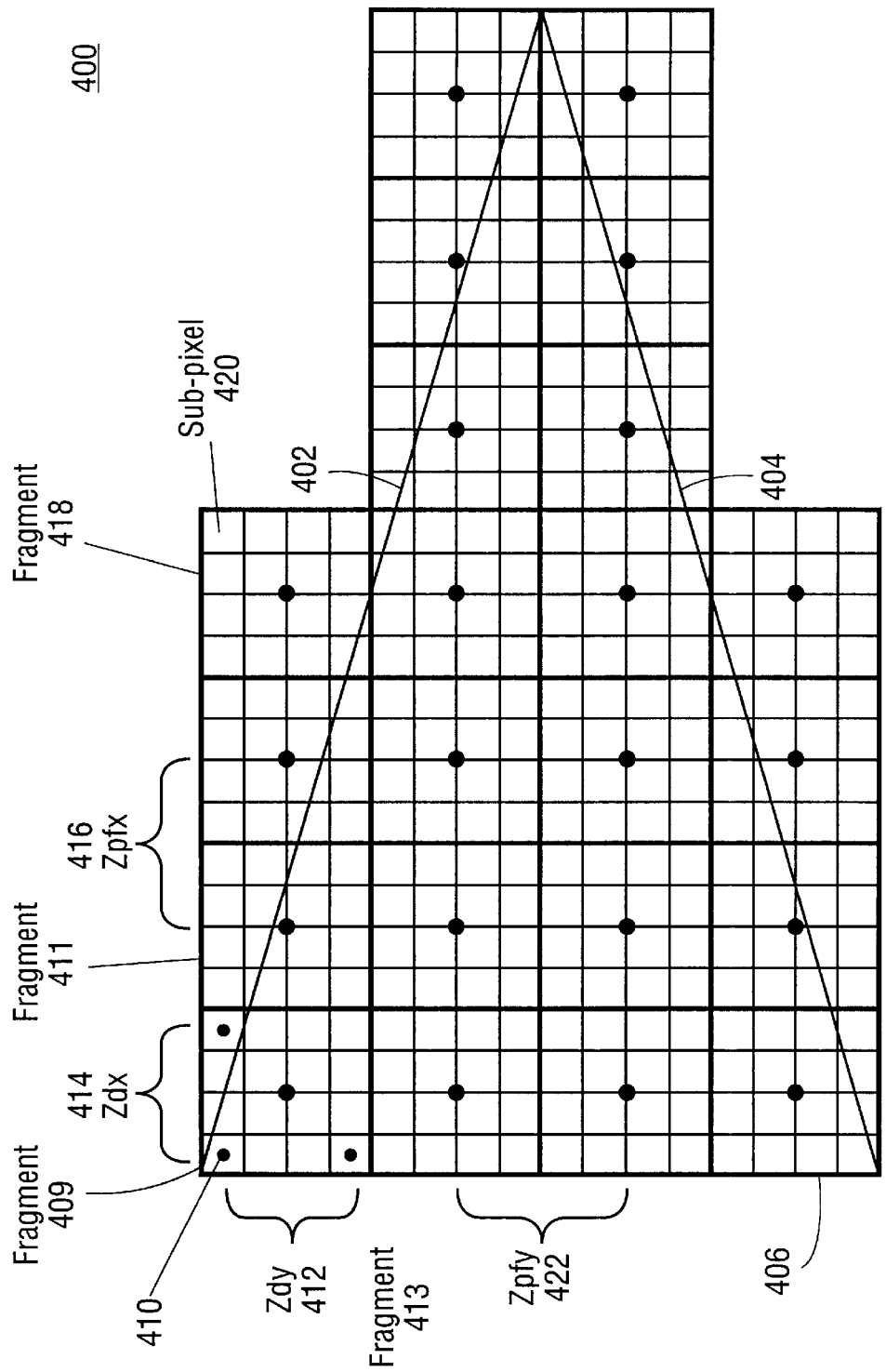
FIG. 4 illustrates one embodiment of a set of fragments representing a portion of polygon.

FIG. 4 illustrates one embodiment of an image 400, which is represented by multiple fragments. Image 400 is a triangle including three sides, which include lines 402, 404, and 406. The triangle is represented by 22 fragments. In one embodiment, each fragment is further divided into 16 sub-fragments and each fragment contains four corner sub-fragments. One of the four corner sub-fragments is, in one embodiment, the closest sub-fragment to the viewer.

For example, sub-fragment 410 is the closest sub-fragment of fragment 409 to the viewer and BZV is the Z value of sub-fragment 410. Also, Zdx 414 is the coded ZOV in the X direction and Zdy 412 is the coded ZOV in the Y direction. The X direction means the X-axis direction where the X-axis is a horizon axis of a Cartesian coordinate system. The Y direction means the Y-axis direction where the Y-axis is a vertical axis of a Cartesian coordinate system. The Z-axis is at right angle to both X-axis and Y-axis and comes out toward the viewer. Moreover, Zpfx 416 indicates a distance between two centers of two fragments in the X direction and Zpfy 422 indicates a distance between two centers of two fragments in the Y direction. In one embodiment, Zpfx 416 and Zpfy 422 are constant for the entire polygon. The fragment coverage mask for each fragment flags which sub-fragments are included as part of the polygon.

Figure 5:
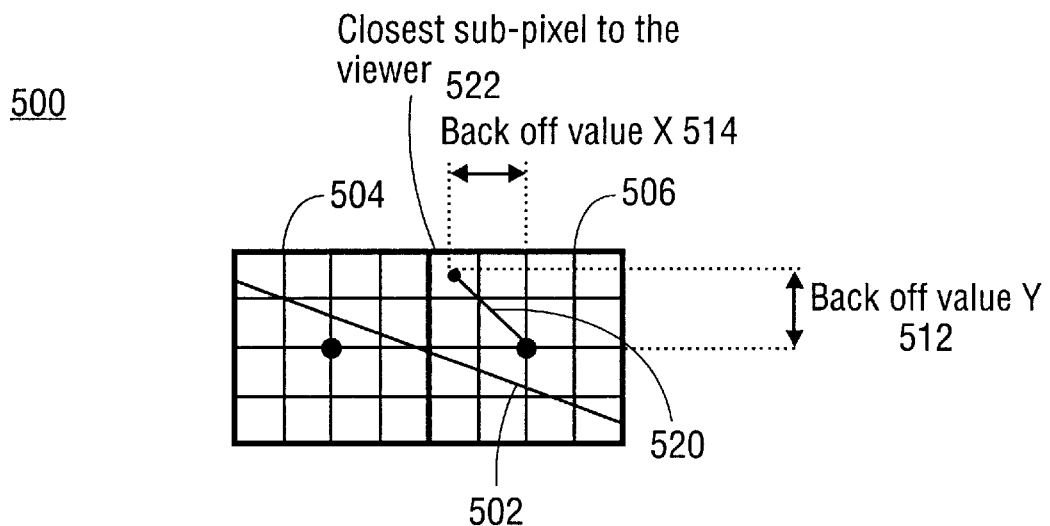
FIG. 5 is a block diagram illustrating one embodiment of a fragment showing a center point and the closest sub-fragment.

FIG. 5 is a block diagram 500 illustrating one embodiment of a fragment showing a center point and the closest sub-fragment. Block diagram 500 contains two fragments 504, 506 and a polygon edge 502. Fragment 506 contains 16 sub-fragments and the sub-fragment 522 is the closest sub-fragment to the viewer.

A Z delta 520 indicates a distance between the center of fragment 506 to the center of the closest sub-fragment 522. The Z delta 520 is, in one embodiment, a constant value for the fragment and it can be expressed by a back-off value x 514 and a back-off value y 512. Accordingly, the center of the closest sub-fragment 522 may be derived from back-off value x 514 and Y 512 and the center of fragment 506. In this embodiment, a back-off value X 514 and y 512 are constant for all fragments within the polygon.

The constant values, such as for example, back-off x 514 and y 512, may be created and encoded when the polygon is being set up for rendering. In an alternative embodiment, two-bit encoded CTF, which points to the closest sub-fragment, removes the need of sign values so that the Z delta is a positive value, which simplifies the processing of the A++ buffer.

Figure 6:
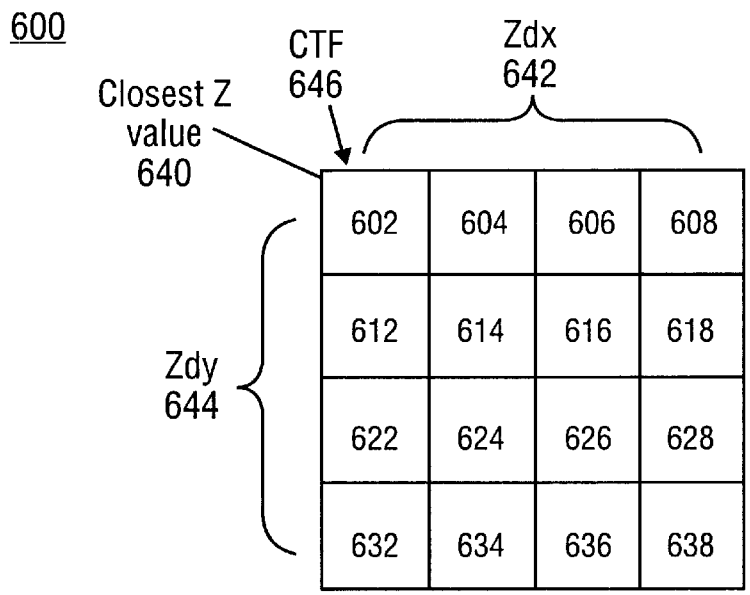
FIG. 6 illustrates one embodiment of the closest sub-fragment containing the closest Z value.

FIG. 6 illustrates one embodiment of a fragment 600 having the closest sub-fragment 602 containing a closest Z value 640. Fragment 600 contains sixteen sub-fragments 602–638. CTF 646 points to sub-fragment 602 indicating that sub-fragment 602 is the closest sub-fragment to the viewer.

BZV 640 is the Z value for sub-fragment 602 because sub-fragment 602 is the closest sub-fragment. Zdx 642 is a coded into ZOV value in the X direction and Zdy 644 is a coded into ZOV value in the Y direction. In one embodiment, Zmx 645 indicates the maximum Z distance in the X direction and Zmy 646 indicates the maximum Z distance in the Y direction. Zdx 642 is the difference between BZV 640 and Zmx 645 while Zdy 644 is the difference between BZV 640 and Zmy 646.

Referring back to FIG. 6, Z values for all sub-fragments within fragment 600 can, in one embodiment, be derived with in the A++ buffer using CTF 646, BZV 640, Zdx 642, and Zdy 644. Zdx 642 and Zdy 644 are decoded from ZOVx and ZOVy within the A++ buffer. For example, the Z value for sub-fragment 608 can be found by adding BZV 640 with Zdx 642. Also, the Z value for sub-fragment 632 can be derived by adding BZV 640 with Zdy 644. In another example, the Z value for sub-fragment 638 may be determined by adding BZV 640 with Zdx 642 and Zdy 644. To derive Z values for the sub-fragments other than the corner sub-fragments, a process of division may be needed to determine the quarter or half of Zdx 642 or Zdy 644. Thus, division can be accomplished with simple bit shifts.

Dividing by 2 can be accomplished by right shift 1-bit position. Likewise, dividing by 4 can be accomplished by right shift 2-bit positions. Accordingly, right shift of Zdx 642 or Zdy 644 may be required to determine the Z values for the sub-fragments other than the corner sub-fragments.

For example, the Z value for sub-fragment 604 can be derived by adding a quarter of Zdx 642 to BZV 640. Note that the quarter of Zdx 642 can be obtained by shifting the content of Zdx 642 to the right for 2 bit positions. Also, the Z value of sub-fragment 606 can be determined by adding a half of Zdx 642 to BZV 640. The half of Zdx 642 can be obtained by shifting the content of Zdx 642 to the right for 1 bit position. Using the derivation method discussed above, all Z values can be derived from BZV 640, Zdx 642 and Zdy 644. Also, Z values may be calculated in parallel to reduce the calculation time.

If the fragment has different sub-fragment dimensions, such as, for example, using an array of 8×8 sub-fragment, an extension of the scheme to determine individual sub-fragment and values will be required.

Figure 7:
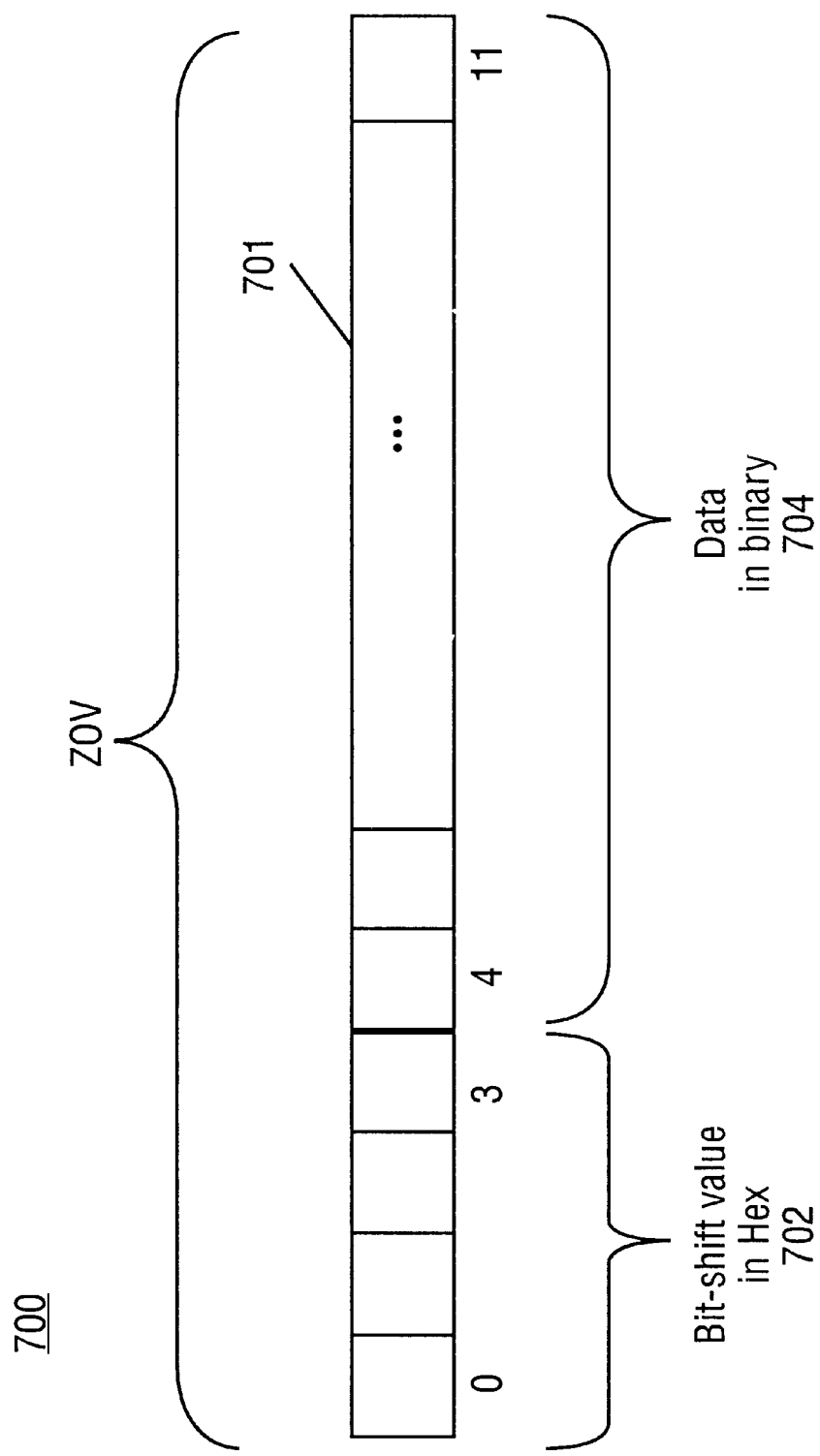
FIG. 7 illustrates one embodiment of a data format 700 for storing a Z offset value.

FIG. 7 illustrates one embodiment of a data format 700 for storing a Z offset value. A coded format 701 is a 12-bit wide format and is divided into two portions, namely, a first and second portions. In one embodiment, the first portion 702 contains four bits (from bit 0–3) and is used to store a shift value. The first portion 702 is, in one embodiment, coded in hex decimal value and can represent a shifting value from 0 bit shifting to 15 bit shifting.

In one embodiment, the second portion contains eight bits (from bit 4–11) and is used to store data in binary format. Since the slope value is positive, the binary value is a positive value. It should be noted that the first and second portions could contain different numbers of bits, but they are not important to understand the present invention.

It is appreciated that Zdx 642 and Zdy 644 are small values. Since a BZV, in one embodiment, is a 24-bit wide value and Zdx 642 is a 24 bit-wide value. Accordingly, the first portion 702 indicates the number of leading zeros that should be added to second portion of 704. Thus, when reconstructing Zdx 642 from ZOVx, multiple leading zeros may be added before an addition between a BZV and a ZOV can be correctly carried out. For example, if eleven zeros followed by a one are identified, the shift value for the first portion 702 would be 1011 and the data for the second portion 704 would be 10000000. The encoded ZOV is 10111000000.

Figure 8:
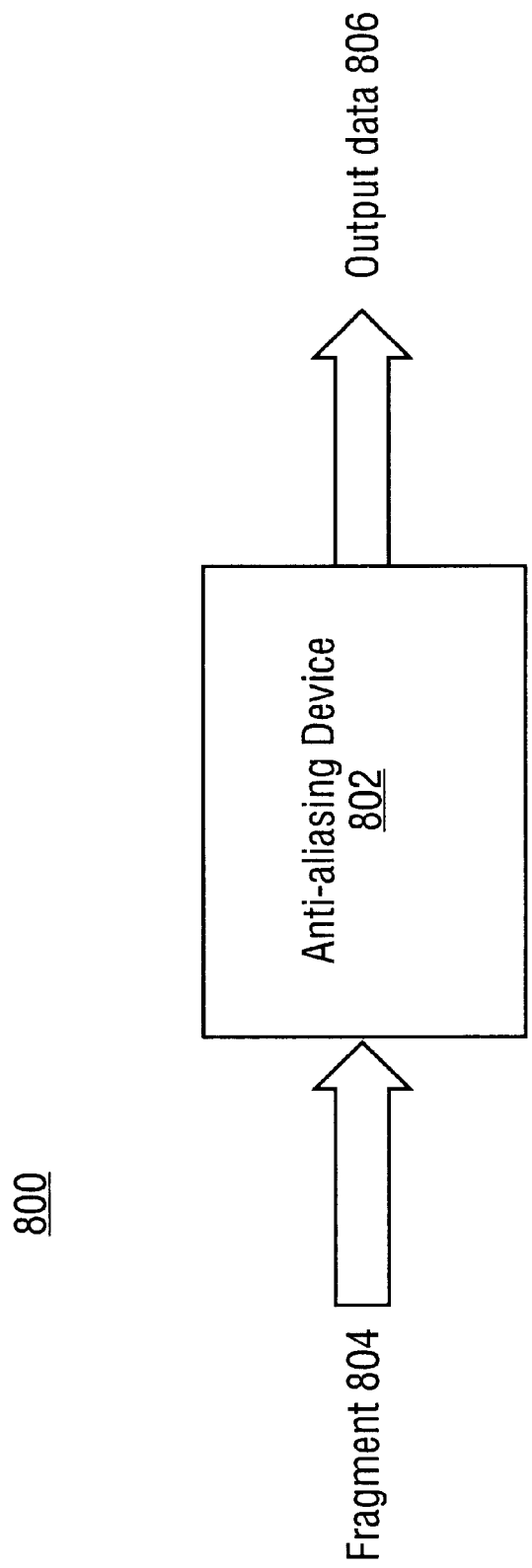
FIG. 8 is a block diagram illustrating one embodiment of an apparatus having an anti-aliasing device.

FIG. 8 is a block diagram 800 illustrating one embodiment of an apparatus having an anti-aliasing device 802, an input 804, and an output data 806. The input 804 include, but are not limited to, BZV, CTF, ZOV in the x direction ("ZOVx"), ZOV in the y direction ("ZOVy"). It should be noted that other blocks could be added in block diagram 800, but they are not necessary to understand the present invention.

CTC points to the closest sub-fragment of the fragment to the viewer and BZV gives the Z value of the closest sub-fragment of the fragment. ZOVx indicates a Z offset value in the X direction while ZOVy indicates a Z offset value in the Y direction.

When anti-aliasing device 802 receives BZV, CTF, ZOVx, and ZOVy, anti-aliasing device 802 anti-aliases all edges of the image. Various anti-aliasing mechanisms, such as, for example, sub-fragment masks, may be used. After anti-aliasing, anti-aliasing device 802 outputs the output data 806.

Figure 9:
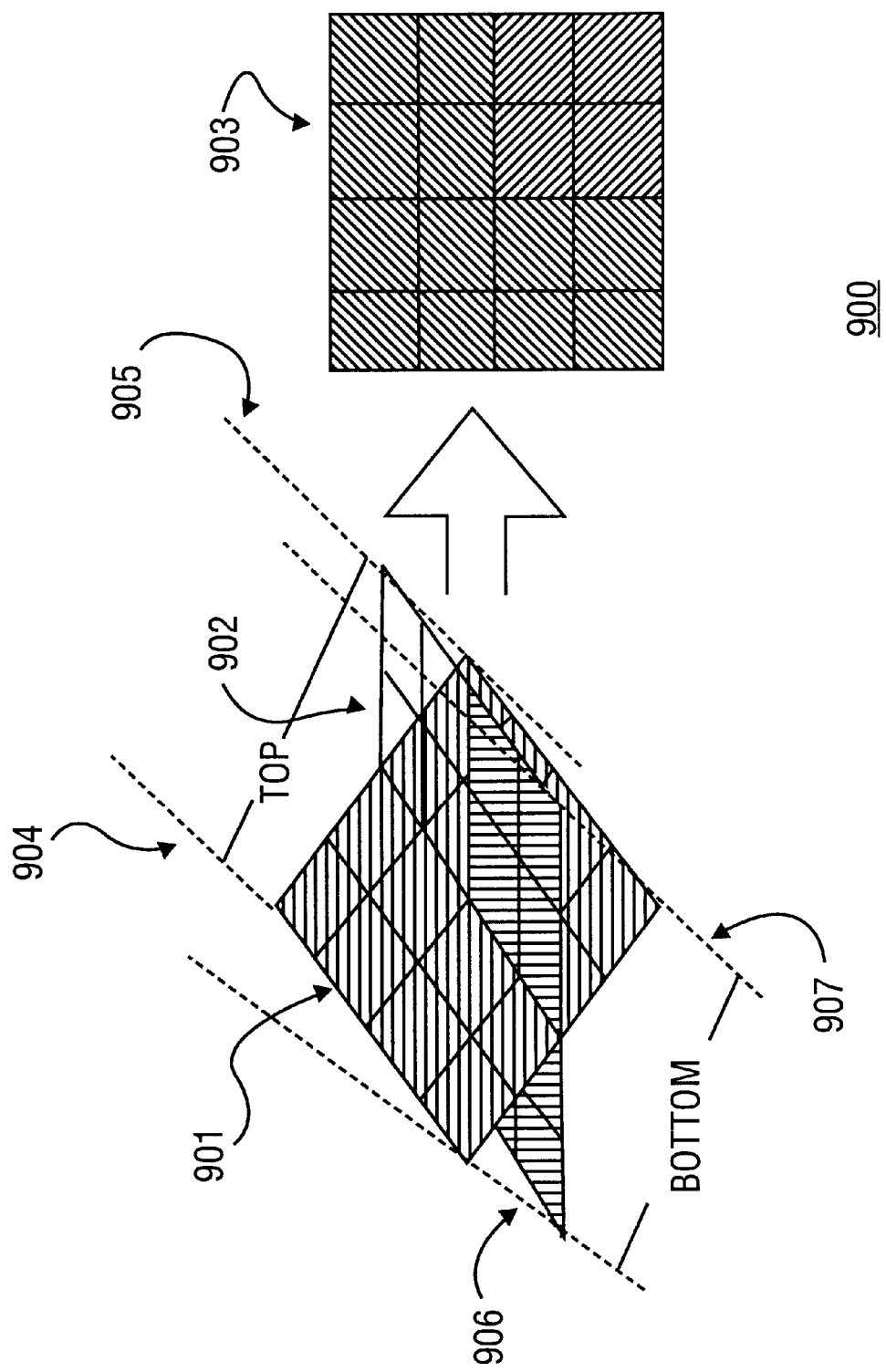
FIG. 9 illustrates an example of two fragments resulting from interpenetrating polygons.

FIG. 9 is a diagram 900 showing how the A++ buffer technique of adding slope information to the fragments can change the final result of combining the contributions from all the fragments in the fragment stack. In this example, fragment 901 and fragment 902 are two fragments that result from interpenetrating polygons. Note that the coverage mask for fragment 902 does not include the top two rows. Guidelines 904, 905, 906 and 907 provide some orientation for which part of the fragment stack is up, down, right and left. Guidelines 904 and 905 are along the top of the fragment stack; guidelines 906 and 907 are along the bottom of the fragment stack. Guidelines 904 and 906 are on the left side of the fragment stack and guidelines 905 and 907 are on the right side of the fragment stack. Thus, fragment 901 provides three quarters of the final coverage result while fragment 902 only contributes one quarter. This produces a more accurate representation of the intersection between these polygons.

Figure 10:
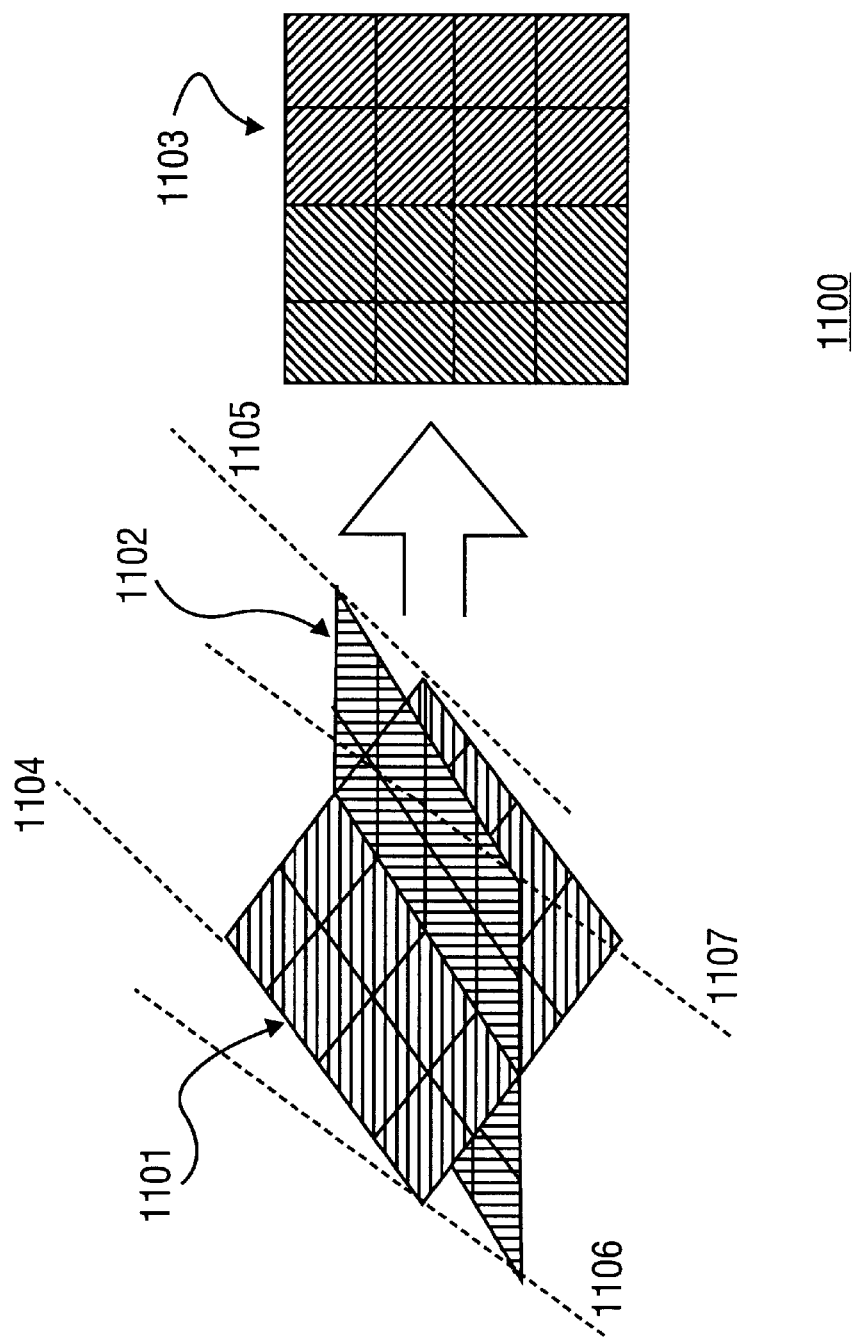
FIG. 10 illustrates another example of two fragments resulting from interpenetrating polygons.

FIG. 10 is another diagram 1000 illustrating the mechanism of the A++ buffer where slope information is included with the fragment data. In this diagram, two interpenetrating polygons produced fragments 1101 and 1102. The inclusion of slope information allows half of fragment 1101 to contribute to the final coverage result 1103 thus providing the anti-aliasing effect. In this case the fragment colors would be combined equally to produce the final pixel color. By adding slope information to the fragment data, interpenetrating polygons get anti-aliased due to the effect of evaluating fragment depth on a sub-fragment basis. As with FIG. 9, a set of guidelines provide orientation for the diagram.

Figure 11:
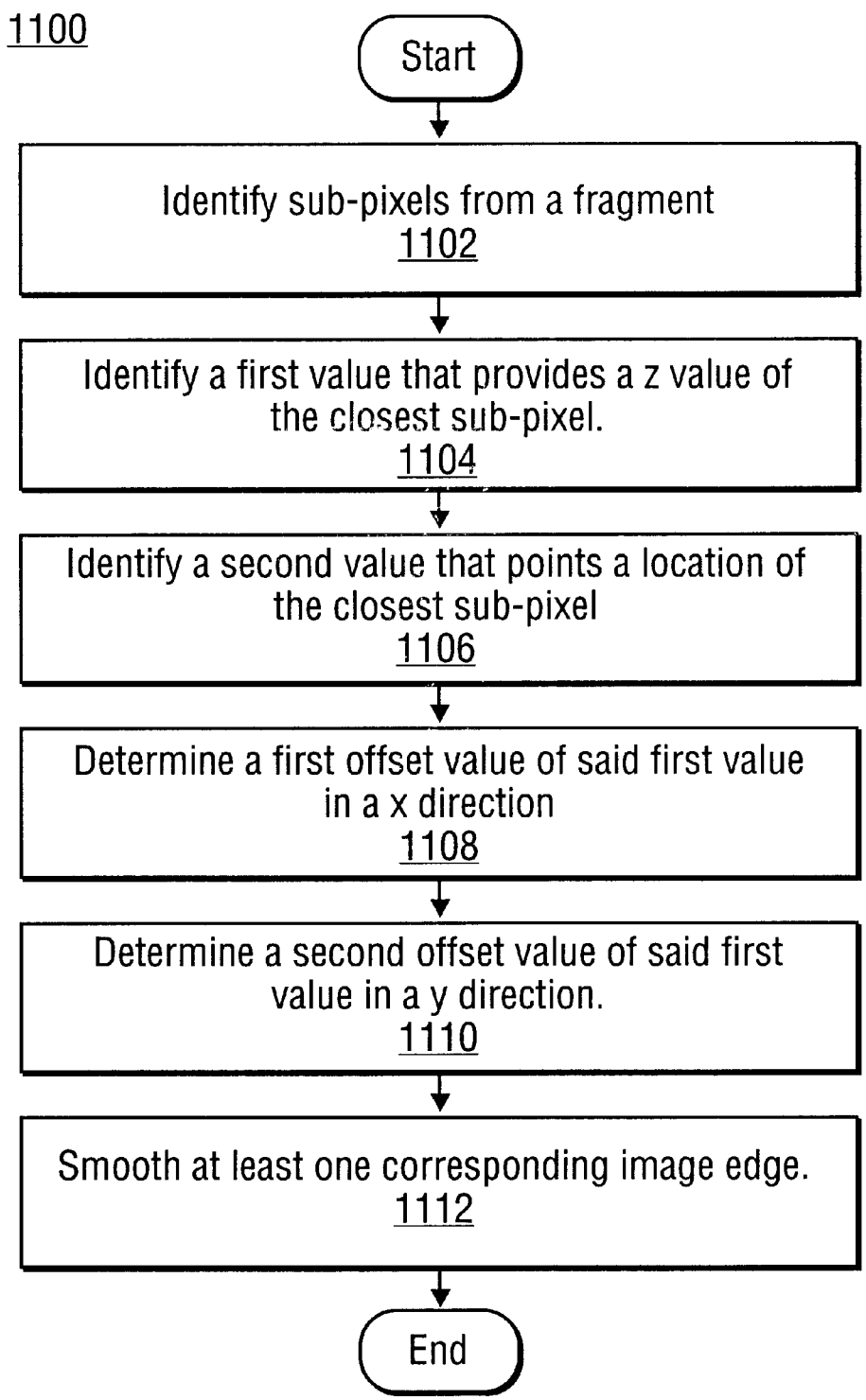
FIG. 11 is a flowchart illustrating one embodiment of an image process for performing a function of anti-aliasing.

FIG. 11 is a flowchart 1100 illustrating one embodiment of a process for performing a function of anti-aliasing. The process begins at the start block and proceeds to block 1102. At block 1102, the process identifies the sub-fragments at a pixel location, which, in one embodiment, could be a fragment. After block 1102, the process proceeds to block 1104. At block 1104, the process identifies a first value that provides a Z value for the closest sub-fragment to the viewer.

The process then proceeds to block 1108. At block 1108, the process determines a first offset value of the first value in the X direction. After block 1108, the process proceeds to block 1110. At block 1110, the process determines a second offset value of the first value in the Y direction. After block 1110, the process proceeds to block 1112. At block 1112, all sub-fragments assigned to that pixel location are compared by Z distance to determine the final pixel color. After block 1112, the process ends at the end block.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claim is:

1. A system comprising:
   a device configured to store a first value, a second value, a first offset value, and a second offset value, said first value representing a Z value of a first sub-fragment, said second value pointing to a location corresponding to said first portion, said first offset value representing an offset value of said first value in x-direction, said second offset value representing an offset value of said first value in y-direction; and
   a processor coupled to said device and configured to perform an anti-aliasing function utilizing said first value, said second value, said first offset value, and said second offset value.

2. The system as set forth in claim 1, wherein said processor is configured to anti-alias edges that are not specified by original vertex data.

3. The system as set forth in claim 1, wherein said device is a modified A-buffer.

4. The system as set forth in claim 1, wherein said first portion is a sub-fragment and said location is a sub-fragment location.

5. The system as set forth in claim 4, wherein said sub-fragment location is located at a corner of a fragment, wherein said fragment includes a plurality of sub-fragments representing a portion of polygon.

6. The system as set forth in claim 1, wherein said second value is a corner tag field that points to a sub-fragment location that is a closest sub-fragment to a viewer.

7. The system as set forth in claim 1, wherein said first value is a Z value of a sub-fragment that is a closest sub-fragment to the viewer.

8. The system as set forth in claim 1, wherein said first offset value indicates a Z value of a corner sub-fragment in an x direction from said first sub-fragment.

9. The system as set forth in claim 1, wherein said second offset value indicates a Z value of a corner sub-fragment location in a y direction from said first sub-fragment.

10. The system as set forth in claim 1, wherein at least one of said first and second offset values is represented by binary data and a shift value specifying a number of leading zeros to be added to said binary data to reconstruct the at least one of said first and second offset values.

11. The system as set forth in claim 1, wherein said first value, said first offset value, and said second offset value are of constant sign.

12. A method comprising:
   identifying sub-fragments from a group of sub-fragment;
   identifying a first value that provides a Z value of the closest sub-fragment of said group of sub-fragments to a viewer;
   identifying a second value that points to a location of said closest sub-fragment;
   determining a first offset value of said first value in an x direction;
   determining a second offset value of said first value in a y direction; and
   smoothing at least one corresponding image edge of said group of sub-fragments utilizing said first value, said second value, said first offset value, and said second offset value.

13. The method as set forth in claim 12, further comprising identifying a Z value for a first corner sub-fragment from said closest sub-fragment in x direction utilizing said first value and said first offset value.

14. The method as set forth in claim 12, further comprising identifying a second corner sub-fragment from said closest sub-fragment in the y direction utilizing said first value and said second offset value.

15. The method as set forth in claim 12, further comprising identifying said closest sub-fragment utilizing back-off value x and back-off value y.

16. The method as set forth in claim 12, further comprising identifying individual Z values of said group sub-fragments in response to said first value, said second value, said first offset value, and said second offset value.

17. The method as set forth in claim 12, wherein at least one of said first and second offset values is represented by binary data and a shift value specifying a number of leading zeros to be added to said binary data to reconstruct the at least one of said first and second offset values.

18. The method as set forth in claim 12, wherein said first value, said first offset value, and said second offset value are of constant sign.

19. An article of manufacture for use in a digital processing system for allowing an implementation of graphic displays, the article of manufacture including a digital processing system usable medium having readable program code embodied in the medium, the program code comprising:
   identifying sub-fragments from a group of sub-fragments;
   identifying a first value that provides a Z value of the closest sub-fragment of said group of sub-fragments to a viewer;
   identifying a second value that points to a location of said closest subfragment;
   determining a first offset value of said first value in an x direction;
   determining a second offset value of said first value in a y direction; and
   smoothing at least one corresponding image edge of said group of sub-fragments utilizing said first value, said second value, said first offset value, and said second offset value.

20. The article of manufacture of claim 19, said program code further comprising identifying a Z value for a first corner sub-fragment from said closest sub-fragment in the x direction utilizing said first value and said first offset value.

21. The article of manufacture of claim 19, said program code further comprising identifying Z values of said group sub-fragments in response to said first value, said second value, said first offset value, and said second offset value.

22. The article of manufacture of claim 19, wherein at least one of said first and second offset values is represented by binary data and a shift value specifying a number of leading zeros to be added to said binary data to reconstruct the at least one of said first and second offset values.

23. The article of manufacture of claim 19, wherein said first value, said first offset value, and said second offset value are of constant sign.

24. An apparatus comprising:
   a first value configured to point to a closest sub-fragment to a viewer;
   a second value configured to represent a Z value of said closest sub-fragment;
   a first offset value configured to indicate a Z value of a closest corner sub-fragment of said fragment in an x direction from said closest sub-fragment;

a second offset value configured to indicate a Z value of a closest corner sub-fragment of said fragment in a y direction from said closest sub-fragment; and an anti-aliasing device configured to anti-alias on at least one image edge utilizing said first value, said second value, said first offset value, and said second offset value.

25. The apparatus as set forth in claim 24, wherein said anti-aliasing device is configured to anti-alias image edges that are not specified by original vertex data.

26. The apparatus as set forth in claim 24, further comprising an A-buffer configured to store said first value, said second value, said first offset value, and said second offset value.

27. The apparatus as set forth in claim 24, wherein said second value is a Z value of a corner sub-fragment that is a closest sub-fragment of a fragment to a viewer.

28. The apparatus as set forth in claim 24, wherein said second value is a Z value of a corner sub-fragment that is a farthest sub-fragment of a fragment to a viewer.

29. The apparatus as set forth in claim 24, wherein said first offset value indicates a Z value of a corner sub-fragment in an x direction from said first sub-fragment.

30. The apparatus as set forth in claim 24, wherein said second offset value indicates a Z value of a corner sub-fragment location in a y direction from said first sub-fragment.

31. The apparatus as set forth in claim 24, wherein at least one of said first and second offset values is represented by binary data and a shift value specifying a number of leading zeros to be added to said binary data to reconstruct the at least one of said first and second offset values.

32. The apparatus as set forth in claim 24, wherein said first value, said first offset value, and said second offset value are of constant sign.

* * * * *